Patented Dec. 17, 1940

2,225,120

UNITED STATES PATENT OFFICE 2,225,120

AZO DYESTUFFS INSOLUBLE IN WATER AND FIBER DYED THEREWITH

Herbert Kracker, Frankfort - on - the - Main-Hochst, Arthur Zitscher, Kronberg in Taunus, and Robert Schmitt, Darmstadt, Germany, assignors to General Aniline & Film Corporation, a corporation of Delaware No Drawing. Application May 2, 1936, Serial No. 77,626. In Germany May 10, 1935

8 Claims. (Cl. 260—193)

The present invention relates to azo dyestuffs insoluble in water and to fiber dyed therewith, more particularly, it relates to compounds of the following general formula:

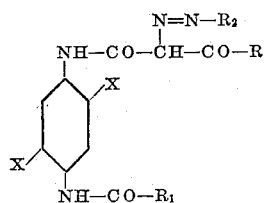

wherein R stands for a member of the group consisting of radicals of the benzene and naphthalene series, $R_1$ for a member of the group consisting of radicals of the benzene and naphthalene series, $R_2$ for a member of the group consisting of radicals of the benzene, naphthalene and anthraquinone series, the radicals R, $R_1$ and $R_2$ being not capable of coupling with diazo-compounds, one X represents an alkoxy group and the other X one of the group consisting of alkoxy, methyl and halogen.

We have found that valuable azo dyestuffs insoluble in water are obtainable by coupling in substance, on the fiber, or on a substratum adapted for the preparation of lakes an acylacetic acid arylide of the general formula:

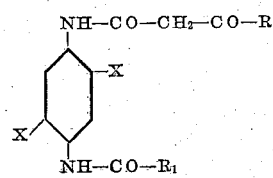

wherein R represents an aryl radical, $R_1$ an aryl radical, one X an alkoxy group and the other X an alkoxy group, methyl or halogen, with the diazo-compound of a monoamine of the aromatic series substituted in any desired manner, only such dyestuff components being used as do not contain any group lending solubility, such as the sulfonic acid or carboxylic acid group.

The new dyestuffs prepared in substance are valuable pigments. They are also especially suitable for the manufacture of water-insoluble dyestuffs on the fiber by the ice-color process or by one of the known printing methods, for instance by the direct printing method, the nitrosamine-printing process of German Patent No. 287,086 or the diazo-amino-printing process of German Patent No. 534,640.

The yellow to orange dyestuffs thus obtained are distinguished by their good all-round properties of fastness, particularly a good fastness to light. Therefore, they constitute a valuable addition to the members of the ice-color and pigment-color classes.

The following examples serve to illustrate the invention, but they are not intended to limit it thereto.

(1) 20 grams of benzoylacetic acid-1-amino-4-benzoylamino-2-chloro-5-methoxybenzene are dissolved in 20 cc. of ethyl alcohol, 20 cc. of acetone, 8 cc. of caustic soda solution of 34° Bé. and 45 cc. of water.

The concentrated solution so obtained is introduced into a mixture of 7000 cc. of water, 80 cc. of Turkey red oil of 50 per cent. strength and 40 cc. of caustic soda solution of 34° Bé., and finally there are added 3000 cc. of sodium chloride solution of 10 per cent. strength.

500 grams of well boiled and dried cotton yarn are grounded for half-an-hour at 30° C. to 40° C. in the grounding liquor above indicated, well squeezed and hydroextracted and then developed for half-an-hour in the following diazo-solution: 120 grams of acid 1,5-naphthalenedisulfonate of 20 per cent. strength of the diazo-compound from 1-amino-2-chloro-5 - trifluoromethylbenzene are dissolved in 10 liters of water and 20 cc. of acetic acid of 50 per cent. strength are added.

When the development is finished the material is well rinsed, soaped at boiling temperature, rinsed again and dried.

A vivid, greenish yellow tint of very good fastness to chlorine, light and weather is obtained.

The dyestuff has the following formula:

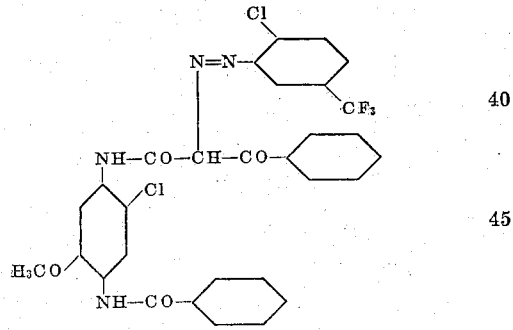

(2) 20 grams of benzoylacetic acid-1-amino-4-benzoylamino-2-methoxy-5-methylbenzene are made into a paste with 20 grams of the sulfonation product of castor oil (prepared according to German Patent No. 113,433) and 21 cc. of caustic soda solution of 34° Bé., and the paste is dissolved by pouring upon it 1 liter of boiling water. Well boiled cotton material is dried, impregnated on a foulard with this grounding liquor, squeezed and dried. The material is then printed with the diazo-printing color made as follows:

10.4 grams of ortho-nitraniline are diazotized with 21 cc. of hydrochloric acid of 21° Bé. and 5.6 grams of sodium nitrite with addition of ice. The whole is made up with water to 500 cc., thickened with 480 grams of tragacanth (60:1000) and rendered neutral to Congo paper with 20 grams of crystallized sodium acetate.

After printing, the material is washed and soaped at boiling temperature. A golden-yellow print of very good fastness to light and weather is obtained.

(3) 29 grams of the disodium salt of the diazo-amino-compound from diazotized 1-amino-3-chloro-benzene and 1-amino-2-carboxybenzene-4-sulfonic acid, mixed with 30 grams of benzoylacetic acid-1-amino-4-benzoylamino-2,5-dimethoxybenzene, are made into a paste with 45 grams of caustic soda solution of 34° Bé., 30 grams of Turkey red oil of 50 per cent. strength and 75 cc. of water; the paste is dissolved by pouring 290 cc. of hot water on it and the solution is made up to 1 kilo of printing color with 500 grams of tragacanth thickening (60:1000).

Desized and bleached cotton material is printed with this paste, dried and steamed in a rapid ager for 5 minutes in the presence of vapors of acetic acid and formic acid. Then the material is rinsed and soaped at boiling temperature.

A very reddish-yellow print of very good fastness to light and weather is obtained.

Shades of similarly good properties of fastness may be obtained with other diazo-compounds and acyl-acetic acid-arylides of the aforesaid constitution.

The following table indicates a number of further azo dyestuffs, obtainable according to the present invention:

The dyestuffs may, of course also be produced on fibers other than cotton. Thus, for instance, on linen, viscose artificial silk, wool, natural silk or the like, the above-described dyeings are obtained with the same tints and properties of fastness.

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

We claim:
1. The water-insoluble azo dyestuff of the following formula:

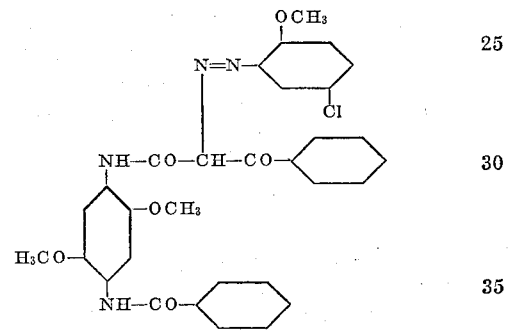

yielding, when produced on the fiber, golden-yellow dyeings of very good fastness to light and to weather.

| | Diazotizing component | Coupling component | Tint |
|---|---|---|---|
| 1 | 1-amino-2-methoxy-5-chlorobenzene | Benzoylacetic acid-1-amino-4-benzoylamino-2,5-dimethoxybenzene | Golden-yellow. |
| 2 | 1-amino-2-methoxy-5-nitrobenzene | do | Do. |
| 3 | Meta-nitraniline | do | Do. |
| 4 | Ortho-chloraniline | do | Reddish-yellow. |
| 5 | Para-nitraniline | do | Orange. |
| 6 | 1-amino-2-nitro-4-methylbenzene | do | Brick-red. |
| 7 | 1-amino-4-chloro-2-nitrobenzene | do | Brown-orange. |
| 8 | 1-amino-2-methyl-4-nitrobenzene | do | Do. |
| 9 | Beta-naphthylamine | do | Do. |
| 10 | 1-amino-2-methyl-4-nitrobenzene | Benzoylacetic acid-1-amino-4-benzoylamino-2,5-diethoxybenzene | Brownish-orange. |
| 11 | 1-amino-2-methyl-4-chlorobenzene | do | Golden-yellow. |
| 12 | 1-amino-2-methoxy-5-chlorobenzene | do | Do. |
| 13 | 1-amino-2-methyl-3-chlorobenzene | do | Do. |
| 14 | 1-amino-2-chloro-5-trifluoromethylbenzene | do | Do. |
| 15 | 1-amino-2-methyl-4-bromo-5-chlorobenzene | do | Do. |
| 16 | 1-amino-4-chloro-2-nitrobenzene | Benzoylacetic acid-1-amino-4-benzoylamino-2-chloro-5-methoxybenzene. | Do. |
| 17 | Ortho-nitraniline | do | Do. |
| 18 | 1-aminoanthraquinone | do | Golden orange. |
| 19 | 2,5-dichloraniline | do | Reddish yellow. |
| 20 | Para-nitraniline | do | Do. |
| 21 | 1-aminoanthraquinone | Benzoylacetic acid-1-amino-4-benzoylamino-2-methoxy-5-methylbenzene. | Golden-yellow. |
| 22 | 2,5-dichloraniline | do | Yellow. |
| 23 | Meta-chloraniline | do | Greenish-yellow. |
| 24 | Meta-nitraniline | do | Yellow. |
| 25 | 1-amino-2-methyl-5-nitrobenzene | do | Reddish-yellow. |
| 26 | 1-amino-2-chloro-5-trifluoromethylbenzene | do | Do. |
| 27 | 1-amino-2-methyl-4-nitrobenzene | Benzoylacetic acid-1-amino-4-(4'-methoxybenzoylamino)-2,5-diethoxybenzene | Orange. |
| 28 | Ortho-nitraniline | Benzoylacetic acid-1-amino-4-(2'-methylbenzoylamino)-2-chloro-5-methoxybenzene | Golden-yellow. |
| 29 | Meta-chloraniline | 4'-chlorobenzoylacetic acid-1-amino-4-benzoylamino-2,5-dimethoxybenzene | Reddish-yellow. |
| 30 | 1-amino-2-methyl-3-chlorobenzene | 4'-methoxybenzoylacetic acid-1-amino-4-benzoylamino-2,5-diethoxybenzene | Golden-yellow. |
| 31 | 1-amino-2-methoxy-5-chlorobenzene | 4'-methylbenzoylacetic acid-1-amino-4-benzoylamino-2,5-dimethoxybenzene | Do. |
| 32 | 1-amino-2-chloro-5-trifluoromethylbenzene | 1'-naphthoylacetic acid-1-amino-4-benzoylamino-2-chloro-5-methoxybenzene | Reddish-yellow. |
| 33 | Meta-nitraniline | 2'-naphthoylacetic acid-1-amino-4-benzoylamino-2-methoxy-5-methylbenzene | Do. |

2. The water-insoluble azo dyestuff of the following formula:

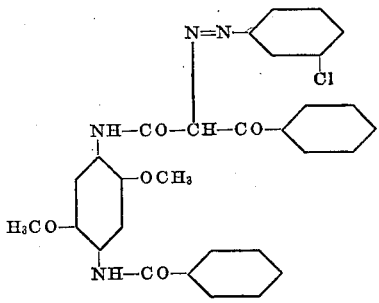

yielding, when produced on the fiber, very reddish-yellow dyeings of very good fastness to light and to weather.

3. Fiber dyed with the water-insoluble azo dyestuff as claimed in claim 1.

4. Fiber dyed with the water-insoluble azo dyestuff as claimed in claim 2.

5. The water-insoluble azo dyestuffs of the general formula:

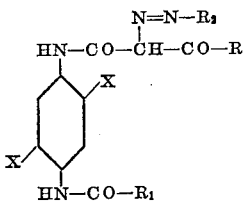

wherein R stands for a radical of the benzene series, $R_1$ stands for a member of the group consisting of radicals of the benzene and naphthalene series, and $R_2$ stands for a member of the group consisting of radicals of the benzene, naphthalene and anthraquinone series, which radicals are not capable of coupling with diazo-compounds, one X represents an alkoxy group, and the other X represents a member of the group consisting of alkoxy, methyl, and halogen, yielding, when produced on the fiber, yellow to orange dyeings of good brightness and richness and of good fastness properties, particularly of very good fastness to light.

6. The water-insoluble azo dyestuffs of the following general formula:

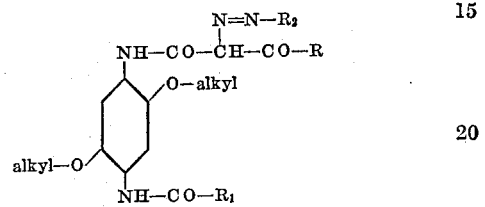

wherein R, $R_1$ and $R_2$ stand for radicals of the benzene series, yielding, when produced on the fiber, yellow to orange dyeings of good brightness and richness and of good fastness properties, particularly of very good fastness to light.

7. Fiber dyed with the water-insoluble azo dyestuff as defined in claim 5.

8. Fiber dyed with the water-insoluble azo dyestuff as defined in claim 6.

HERBERT KRACKER.
ARTHUR ZITSCHER.
ROBERT SCHMITT.